United States Patent
Cothran et al.

(10) Patent No.: US 10,498,651 B1
(45) Date of Patent: Dec. 3, 2019

(54) METHOD AND SYSTEM FOR COMPUTER DATA ROUTING OPTIMIZATION

(71) Applicant: BEANSTALK PAYMENT TECHNOLOGIES, Cincinnati, OH (US)

(72) Inventors: Robert Cothran, Castle Rock, CO (US); Angie Ammon, Covington, KY (US); Sean Donovan, Cincinnati, OH (US)

( * ) Notice: Subject to any disclaimer, the term of this patent is extended or adjusted under 35 U.S.C. 154(b) by 0 days.

(21) Appl. No.: 16/295,250

(22) Filed: Mar. 7, 2019

(51) Int. Cl.
- *H04L 12/26* (2006.01)
- *H04L 12/747* (2013.01)
- *H04L 12/751* (2013.01)
- *H04L 12/721* (2013.01)
- *H04L 12/707* (2013.01)

(52) U.S. Cl.
CPC .......... *H04L 45/742* (2013.01); *H04L 45/02* (2013.01); *H04L 45/22* (2013.01); *H04L 45/70* (2013.01); *H04L 45/72* (2013.01)

(58) Field of Classification Search
CPC ......... H04L 45/22; H04L 45/28; H04L 45/00; H04L 45/12; H04L 43/10; H04L 45/24; H04L 45/70
See application file for complete search history.

(56) References Cited

U.S. PATENT DOCUMENTS

| | | | |
|---|---|---|---|
| 8,103,789 B1 * | 1/2012 | Gan | G06F 11/1464 370/242 |
| 2011/0164518 A1 * | 7/2011 | Daraiseh | H04L 45/121 370/252 |

* cited by examiner

*Primary Examiner* — Chirag R Patel
(74) *Attorney, Agent, or Firm* — Frost Brown Todd LLC (57) ABSTRACT

Computer data routing optimization may include determining a set of potential routing networks comprising a default routing network and one or more alternative routing networks. Path selection criteria values may be determined for each of these networks, and, based on a determination that the path selection criteria value for at least one of the alternative networks corresponds to the path selection criteria value for the default routing network, a determination could be made of whether context specific rules should be applied to the set of potential routing networks. Based on that determination, an optimal routing network may be determined by applying a set of one or more context specific rules to the set of potential routing networks.

12 Claims, 5 Drawing Sheets

METHOD AND SYSTEM FOR COMPUTER DATA ROUTING OPTIMIZATION

FIELD

The technology disclosed herein can be applied to improve the routing of data between computer systems.

BACKGROUND

It is commonplace to selectively use different networks for routing data in an attempt to obtain superior outcomes. However, existing approaches used for this have a number of drawbacks. For example, in some cases, routing systems may be implemented to simply check if a network within a particular class and/or having a particular attribute is available and, if it is, will automatically use that network. However, this can lead to sub-optimal results, such as in a case where a particular network is inappropriate for a particular routing task even if that network is part of a class and/or has an attribute that would normally be expected to lead to superior results. Even more sophisticated systems that optimize various path selection criteria when making routing decisions can have drawbacks. For example, the selection and/or calculation of various path selection criteria may be opaque and/or difficult which, in some contexts, may cause routing systems to eschew this type of routing entirely. Similarly, even when optimization of path selection is implemented, it may lead to sub-optimal results. For example, in a case where there is some contextual requirement, such as security, that is not reflected in a routing system's optimized path selection criteria, optimization of path selection criteria may result in a network being used that is inappropriate for a particular task even though it would provide optimized path selection criteria values. Accordingly, for these and other reasons there is a need for improvements in computer systems used in routing data.

SUMMARY

Disclosed herein is technology which can be implemented in a variety of manners, including systems and methods for computer data routing optimization. For example, some embodiments may be implemented as methods comprising a set of route optimization steps. Such steps may comprise receiving a data package which may identify a default routing network. Such a set of route optimization steps may also comprise determining a set of potential routing networks, and such a set of potential routing networks may comprise the default routing network and one or more alternative routing networks. Such a set of route optimization steps may also comprise determining a corresponding path selection criteria value for each network from the set of potential routing networks. Such a set of route optimization steps may also comprise determining whether the corresponding path selection criteria value for at least one alternative network from the set of potential routing networks surpasses the corresponding path selection criteria value for the default routing network. Such a set of route optimization steps may also comprise, based on determining that the corresponding path selection criteria value for at least one alternative network from the set of potential routing networks surpasses the corresponding path selection criteria value for the default routing network, determining whether context specific rules should be applied to the set of potential routing networks. In some such embodiments, a set of route optimization steps may comprise, based on a determination that the context specific rules should be applied to the set of potential routing networks, determining an optimal routing network by applying a set of one or more context specific rules to the set of potential routing networks. Corresponding systems comprising a computer adapted to perform such a set of route optimization steps, as well as other ways of implementing the disclosed technology are also possible, and so the material set forth in this summary should be understood as being illustrative only, and should not be treated as limiting.

BRIEF DESCRIPTION OF THE DRAWINGS

The drawings and detailed description which follow are intended to be merely illustrative and are not intended to limit the scope of the appended claims.

DETAILED DESCRIPTION

Disclosed herein is novel technology which can be used for a variety of purposes, including improving the operation of computer data routing systems. It should be understood that, while the present disclosure focuses on embodiments in which the disclosed technology is used for improving the operation of systems used to make network routing determinations, and in particular to make such determinations in the context of payment card transactions, the disclosed technology can be used in other contexts as well, such as routing non-payment data through various computer networks. Accordingly, the exemplary embodiments described herein should be understood as being illustrative only, and should not be treated as limiting on the protection provided by this document or any related document.

As one exemplary embodiment, aspects of the disclosed technology can be used to implement a method comprising a set of route optimization steps. Such steps may comprise receiving a data package which may identify a default routing network. Such a set of route optimization steps may also comprise determining a set of potential routing networks, and such a set of potential routing networks may comprise the default routing network and one or more alternative routing networks. Such a set of route optimization steps may also comprise determining a corresponding path selection criteria value for each network from the set of potential routing networks. Such a set of route optimization steps may also comprise determining whether the corresponding path selection criteria value for at least one alternative network from the set of potential routing networks surpasses the corresponding path selection criteria value for the default routing network. Such a set of route optimization steps may also comprise, based on determining that the corresponding path selection criteria value for at least one alternative network from the set of potential routing networks surpasses the corresponding path selection criteria value for the default routing network, determining whether context specific rules should be applied to the set of potential routing networks. In some such embodiments, a set of route optimization steps may comprise, based on a determination that the context specific rules should be applied to the set of potential routing networks, determining an optimal routing network by applying a set of one or more context specific rules to the set of potential routing networks.

As another example, in some embodiments such as described in the preceding paragraph, determining whether context specific rules should be applied to the set of potential routing networks comprises determining whether context specific rules associated with a source of the data package had been previously stored in a database. Additionally, in some such embodiments, such a database may have stored therein a plurality of sets of context specific rules, each of which corresponds to a different data package source.

As another example, in some embodiments such as described in either of the last two preceding paragraphs, the corresponding path criteria selection value for at least one network from the set of potential networks may surpass the corresponding path selection criteria value for the optimal routing network.

As another example, in some embodiments such as described in any of the last three preceding paragraphs, for each potential routing network, determining the corresponding path selection criteria value may comprise determining two or more subcriteria values for that potential routing network. In some such embodiments, determining the corresponding path selection criteria value for each potential routing network may also comprise combining each of the two or subcriteria values for that network into the corresponding path selection criteria value for that potential network.

As another example, in some embodiments such as described in any of the last four preceding paragraphs receiving the data package may comprise receiving an indication that the data package should be only partially processed. In some such embodiments, the method may comprise, after determining the set of potential routing networks, generating an ID for the set of potential routing networks, storing intermediate processing data comprising the set of potential routing networks with the ID, sending an intermediate result processing message comprising the ID to a source of the data package, and ceasing performance of the set of route optimization steps. In some such embodiments, the method may comprise, after sending the intermediate result processing message and ceasing performance of the set of route optimization steps, receiving a routing request comprising the ID and, based on receiving the routing request comprising the ID, retrieving the intermediate processing data and resuming the set of route optimization steps using the intermediate processing data.

As another example, in some embodiments such as described in the preceding paragraph, the set of route optimization steps may be performed using a route optimization server. In some such embodiments, the method may comprise, for each of a plurality of different data packages, performing one or more steps from the set of route optimization steps with that data package. In some such embodiments, the method may also comprise performing a comparison of one or more data packages that were routed by the route optimization server and one or more data packages that were not routed by the route optimization server during a preceding time period. In some such embodiments, the method may also comprise, based on the comparison, identifying one or more potential optimizations that could be made by one or more submitters of data packages during a subsequent time period.

As another example, in some embodiments such as described in any of the preceding six paragraphs, the data package may be a request to route a payment card transaction made with a credit card. In some such embodiments, the default routing network may be the credit card's bugged network. In some such embodiments, the set of alternative routing networks may be debit card networks through which transactions for the credit card's issuing bank can be routed.

As another example, in some embodiments such as described in any of the preceding seven paragraphs, for each potential routing network from the set of potential routing networks, the corresponding path selection criteria value for that potential routing network may comprise a cost for routing the data package through that potential routing network. In some such embodiments, a corresponding path selection criteria value for at least one network from the set of potential networks may surpass the corresponding path selection criteria value for the optimal network by being a lower cost than a cost for routing the data package through the optimal routing network.

As another example, in some embodiments such as described in any of the preceding eight paragraphs, for each potential routing network the corresponding path selection criteria value for that potential routing network may be a cost for routing a payment card transaction corresponding to the data package through that potential routing network. In some such embodiments where determining the path selection criteria value comprises determining two or more subcriteria values, the two or more subcriteria values may comprise a network fee and an interchange fee. In some such embodiments, for each potential routing network from the set of potential routing networks, determining the corresponding path selection criteria value for that potential routing network may comprise combining the network fee and the routing fee into the corresponding path selection criteria value for that network.

As another example, some embodiments may also provide systems for performing methods such as described in any of the preceding nine paragraphs.

As another example, some embodiments may provide a machine comprising a means for rules engine computer data routing optimization and a network coupled to the means for computer data routing optimization. In some such embodiments, the means for computer data routing optimization may comprise a computer adapted to perform steps comprising receiving a data package requesting processing of a payment card transaction made with a credit card. In some such embodiments, the steps the computer is adapted to perform may comprise determining a set of potential routing networks comprising the credit card's bugged network and one or more debit networks. Such a determination may be based on identifying a set of debit networks through which transactions for the credit card's issuing bank can be routed, and determining the one or more debit networks based on applying one or more filtering operations to the set of debit networks. In some such embodiments, the steps the computer is adapted to perform may comprise determining a routing cost for each network in the set of potential routing networks. This may comprise, for each potential network in the set of potential routing networks, determining a network fee for that potential network, determining an interchange fee for that potential network, and combining the network and interchange fees for that potential network. In some such embodiments, the steps the computer is adapted to perform may comprise, based on determining that the routing cost for at least one debit network from the set of potential routing networks is lower than the routing cost for the credit card's bugged network, determining, based on a source of the data package, whether context specific rules should be applied to the set of potential routing networks. In such an embodiment, the computer may also be adapted to, based on a determination that context specific rules should be applied to the set of potential routing networks, determining an optimal routing network by applying a set of one or more context specific rules to the set of potential routing networks.

Other embodiments are possible, will be immediately apparent to, and could be implemented without undue experimentation by those skilled in art, based on this disclosure. Accordingly, the exemplary embodiments described above, as well as those set forth elsewhere in this disclosure should be understood as being illustrative only, and should not be treated as limiting.

Figure 1:
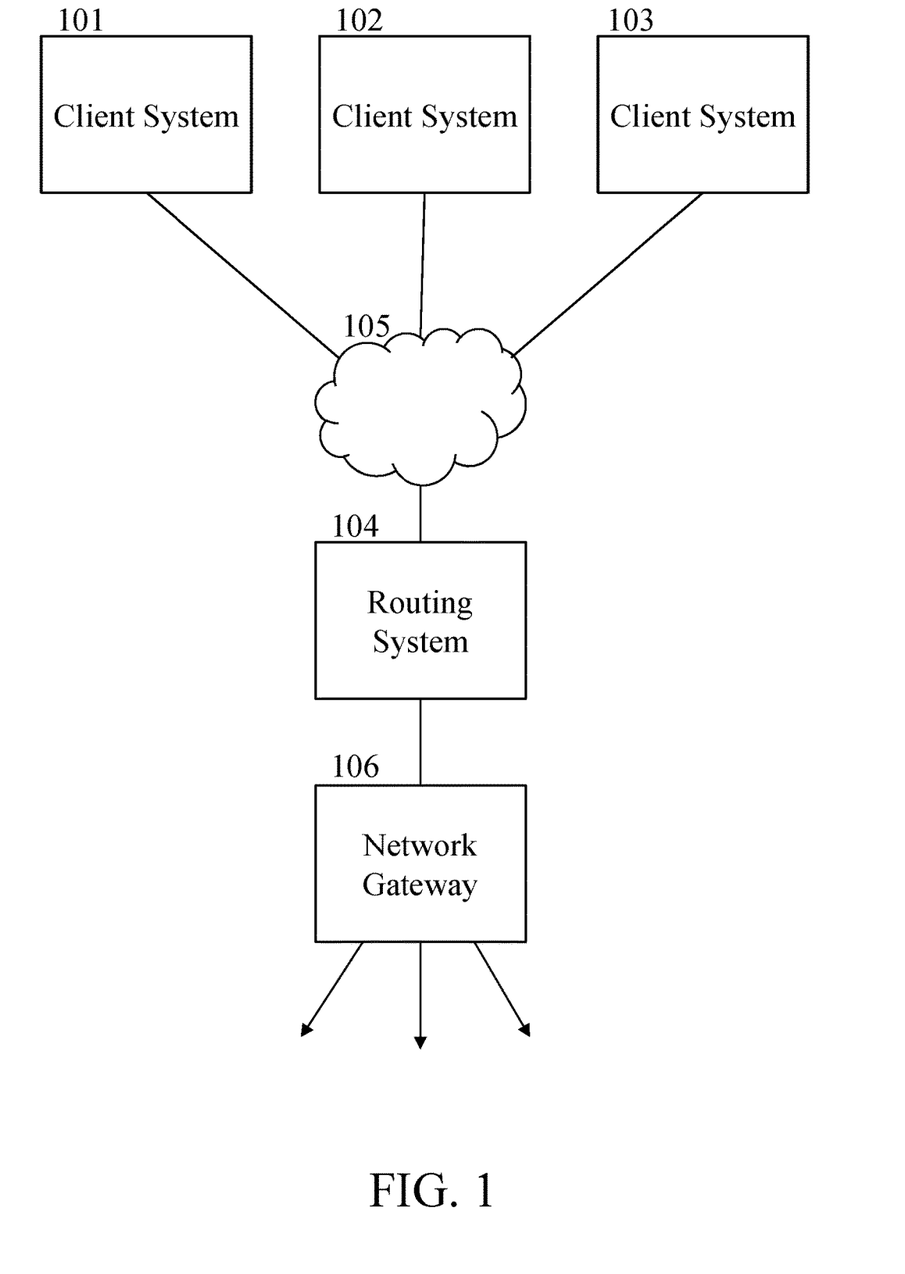
FIG. 1 depicts an environment in which aspects of the disclosed technology could be deployed.

Turning now to FIG. 1, that figure provides a high-level depiction of an environment in which aspects of the disclosed technology may be employed. As shown in that figure, such an environment may include a plurality of client systems 101 102 103 connected to a routing system 104 through a network 105. The routing system 104, in turn, is connected to a network gateway 106, which would itself be connected to a variety of networks (not shown in FIG. 1) through which data provided by the client systems 101 102 103 could be routed.

As a real-world example of an environment of the type shown in FIG. 1, consider the routing of payment card transactions. When a payment transaction is made with a credit card, it will generally be routed to the issuing bank over the "bugged" credit network—i.e., the default network through which a transaction made with that card will be routed. However, in some cases it may be possible to lower the transaction's network and/or interchange fees, such as by routing the transaction to the issuing bank through a debit network rather than through the "bugged" credit network. When the disclosed technology is used to determine this type of optimal routing in an environment such as shown in FIG. 1, the client systems 101 102 103 could be merchant computer systems, the network 105 may be the internet, and the routing system 104 may be a (physical or virtual) server configured to expose an API that would allow merchant computer systems to submit information about transactions that the routing system 104 would process to determine how those transactions should be optimally routed. In such an embodiment, the network gateway 106 could be implemented using a dedicated router for an interbank network (or multiple dedicated routers if multiple interbank networks were used) that would allow transactions to be passed from the routing system 104 to various debit networks so that the payment card transactions from the various client systems 101 102 103 could be processed.

Figure 2:
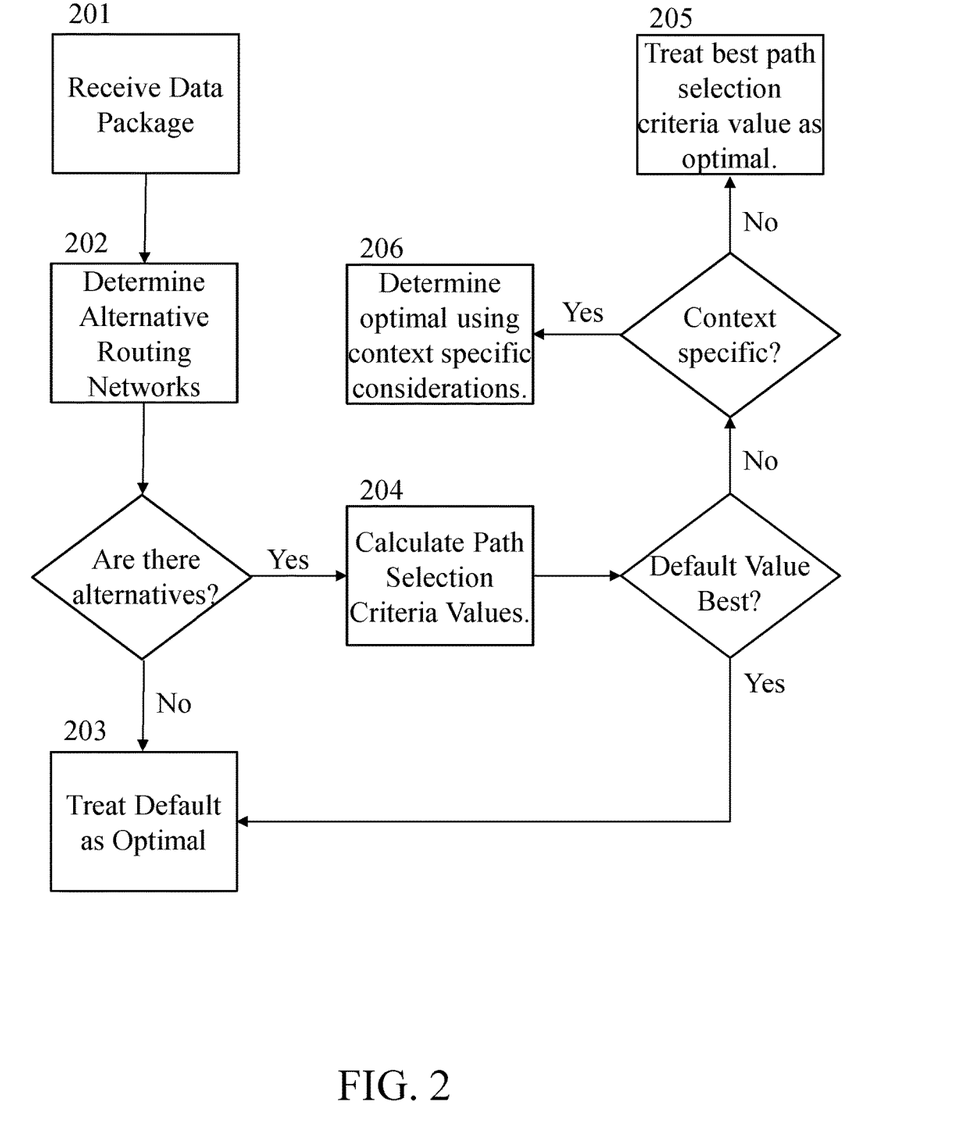
FIG. 2 provides a high-level illustration of a process that could be used to determine optimal routing networks.

Turning now to FIG. 2, that figure provides a high-level illustration of a process that could be used to determine optimal routing networks. Initially, in the process of FIG. 2, a data package having a default routing network is received 201. Using this data package, a routing system 104 such as shown in FIG. 1 could then perform a set of database lookups to determine 202 a set of alternative routing networks. If the determination 202 indicated that the cardinality of set of alternative routing networks was zero, then the data package's default network could be identified 203 as the optimal routing network. Otherwise, if the cardinality of the set of alternative networks was greater than zero (i.e., there was at least one potential alternative routing network), then path selection criteria values could be calculated 204 for each of the networks (i.e., the default network and each of the alternative routing networks).

After path selection criteria values are calculated 204 for each network, if the value for the default network was better than that for any of the alternative routing networks, the default network could once again be identified 203 as optimal. Otherwise, if at least one of the alternative routing networks had a better path selection criteria value than the default network, then a determination could be made of whether there were any context specific considerations that should be incorporated. If there were not, then the routing network with the best path selection criteria values could be treated 205 as optimal. Otherwise, the context specific considerations could be used to determine 206 the network to treat as optimal, such as by invoking a set of context specific rule that might or might not result in the network with the best path selection criteria value(s) being treated as optimal.

To illustrate how a process such as that shown in FIG. 2 might operate in practice, consider again the example of payment card transaction routing. In that context, a data package could be received 201 when a merchant computer system sends a request to determine optimal routing for a payment card transaction made using a credit card to a routing system 104 via an API. Such an API might require the merchant computer system to provide information such as an ID of the merchant providing the goods/services paid for in the payment card transaction, the channel through which the transaction takes place (e.g., in person or online), an identifier for the bank that issued the card used in the transaction, and an amount for the transaction. In this type of system, the data package might be submitted in a variety of forms, such as a message in JSON, XML or other data interchange format, in a proprietary form required by the API, or in some other form as may be appropriate in a particular context.

Figure 3:
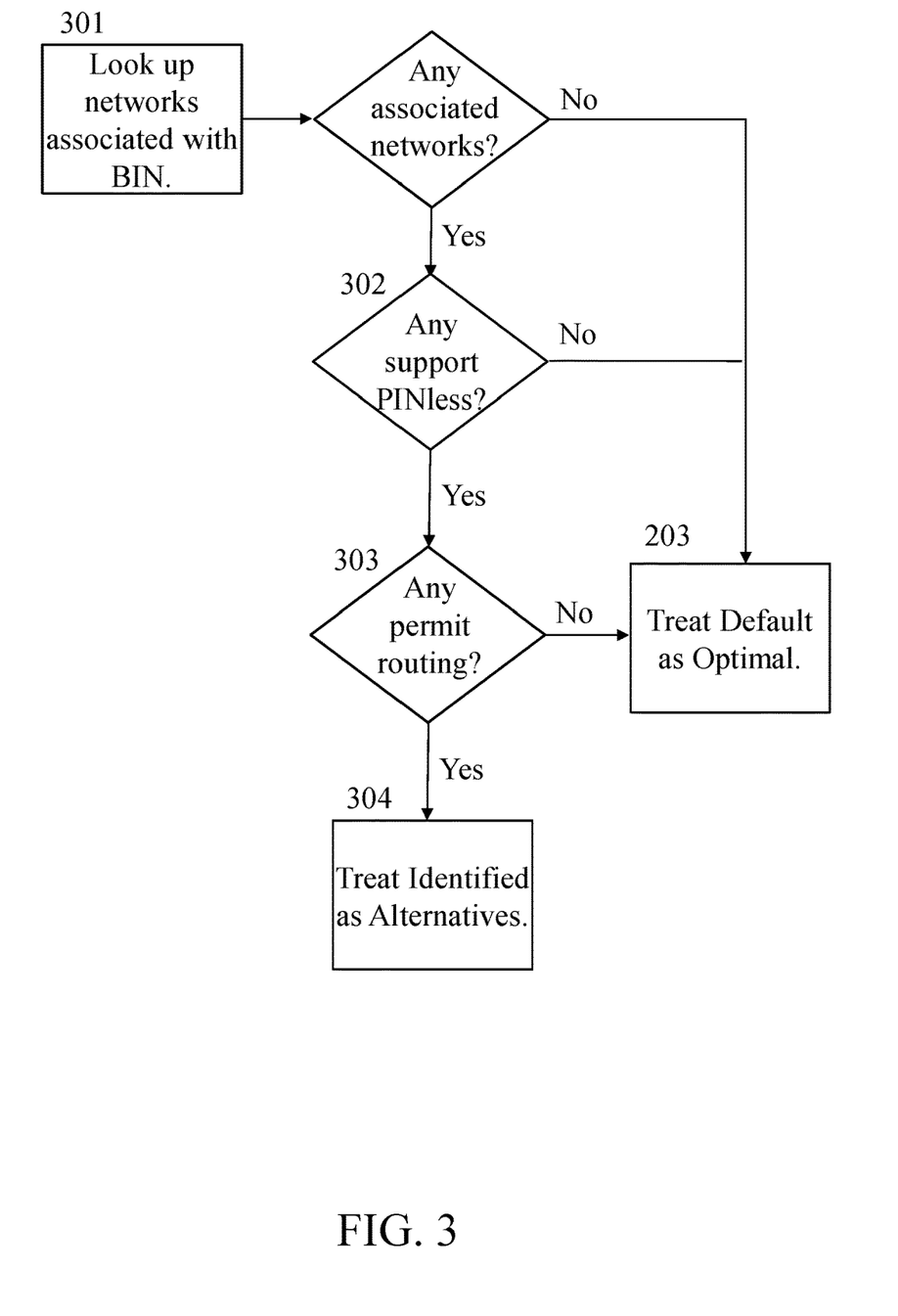
FIG. 3 depicts a process that could be used in some embodiments to determine alternative routing networks.

Using the information provided via the API (potentially after performing some additional processing on the same, such as serializing a message passed through the API into a data object that would be operated on by the routing system's internal components and modules), the routing system 104 could then determine 202 if there were alternative routing networks through which the transaction could be processed. In some embodiments, this could be supported by the routing system 104 maintaining a database showing, for each issuing bank, all debit networks that have contractual relationships with that bank under which those debit networks could process transactions for payment cards issued by that bank. In embodiments where such a database is present, the determination 202 of alternative routing networks could proceed as shown in FIG. 3. In that figure, initially, a database query will be executed 301 to identify each debit network associated with the bank that issued the payment card. If the database query indicated that there were one or more debit networks associated with the issuing bank, a check 302 could be performed of if any of the associated networks supported PINless processing (e.g., by looking up a PINless processing flag in the database records retrieved 301 by the initial query). Then, for each of the associated networks that do support PINless processing, a further determination 303 could be made (e.g., by submitting a second database query using the name of the network, or by looking up a supported flag in the database records retrieved 301 by the initial query) of whether those networks had contractual relationships with the entity maintaining the routing system 104 allowing that entity to submit transactions to those networks.

In the process of FIG. 3, after the various determinations had been made, any networks that satisfied the requirements of the database lookup(s) and applied filter(s) (i.e., they could process transactions for payment cards from the issuing bank, they supported PINless processing, and they had a relationship with the entity maintaining the routing system such that they would accept requests from it to process transactions) could be treated 304 as alternatives to the default routing network for the transaction. Alternatively, if no networks satisfied the requirements, then the default network could be treated as optimal 203 for processing the transaction. This could be done, for example, by sending a message to the merchant system that originally submitted the transaction via the API indicating that the default network for the transaction (e.g., if the payment card used in the transaction was a VISA credit card, then the VISA credit network) should be used to process the transaction.

Of course, other approaches are also possible. For example, in some embodiments, instead of simply sending a message indicating that the default network was optimal, a routing system 104 might send a particular reply indicating the condition which led to the default network being treated as optimal. In such an embodiment, if no potential alternative routing networks were identified in the initial database lookup 301, a no result found message (e.g., HTTP 404) could be returned. If potential alternative routing networks were identified in the initial database lookup 301, but none of them supported PINless processing, then a transaction not routable message could be returned. Similarly, if no potential alternative routing networks had relationships that would allow the entity maintaining the routing system 104 to submit transactions to them, then a not routable message could be returned that may also indicate that the transaction was not routable because it was not supported by that entity.

Figure 4:
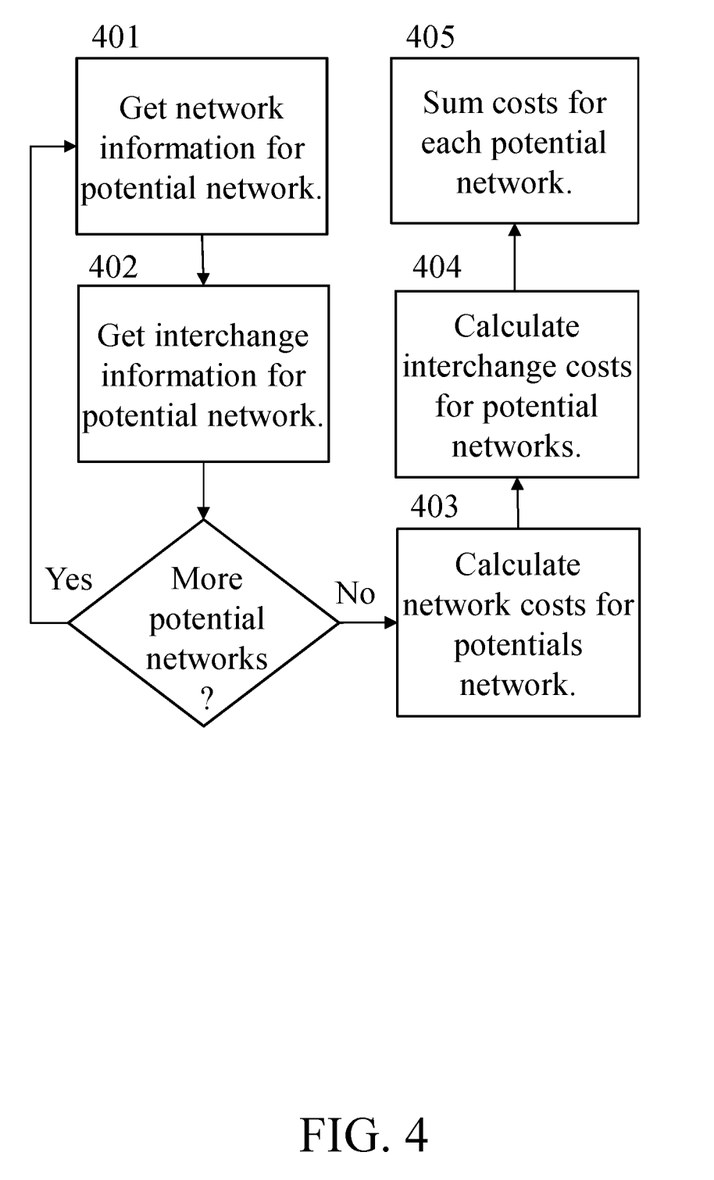
FIG. 4 depicts a process that could be used in some embodiments to calculate path selection criteria values.

Moving on from the discussion of FIG. 3, however a determination is made of whether there are alternative routing networks, and whatever messages (if any) are passed as a result of that determination, in the event that there is at least one alternative routing network, the process of FIG. 2 would proceed with the calculation 204 of path selection criteria values. To continue with the example of how the process of FIG. 2 could be used in the routing of payment card transactions, FIG. 4 illustrates a process that could be used to calculate path selection criteria values which, in the context of payment card transaction values, would preferably be networks costs for routing the transaction through the various networks. Initially, in the process of FIG. 4, network information for one of the potential networks (i.e., the default network or one of the previously identified alternative networks) would be retrieved 401. This could be done, for example, by performing a database query for the particular network and retrieving information on how network fees are calculated by that network (e.g., variable fees, fixed fees, overall fee ceilings). Interchange information, such as how interchange fees would be calculated by a particular potential network could be retrieved 402 in a similar manner (e.g., by querying an interchange fee database), and these steps could be repeated until the network and interchange information had been retrieved for each of the potential networks.

Once the network and interchange information had been retrieved, an embodiment following a process such as shown in FIG. 4 could proceed with calculating 403 the network costs and calculating 404 the interchange costs for each of the networks. Preferably, this would be based on the retrieved information, potentially supplemented by additional data obtained, such as could be obtained by one or more database lookups. For example, a database query for a particular alternative network could reveal that that network calculated interchange fees using an equation with the underlying bank type, payment channel, and industry of the transaction as parameters. In this case, to calculate the interchange fees for that network, a database query could be made using the merchant ID initially passed in through the API to determine the industry of the transaction, and that information, along with the information passed directly through the API, could be used to determine the relevant fee. Once calculated 403 404, the interchange and network fees could then be summed 405 for each of the potential networks to obtain total routing charges for each of them.

Of course, it should be understood that the approach described above in the context of FIG. 4 is intended to be illustrative only, and should not be treated as limiting. For example, rather than getting all network and interchange information for the potential networks before calculating either network or interchange costs, some embodiments may gather network information and use it to calculate network costs, before gathering interchange information and using it to calculate interchange costs. Similarly, in some cases, rather than gathering information for multiple potential networks before calculating costs for any of those networks, information could be gathered and costs calculated on a network by network basis. Other variations, such as reversal of the order of retrieving information for and/or calculating network and interchange costs are also possible and will be immediately apparent to those of ordinary skill in the art in light of this disclosure. Accordingly, the approach illustrated in FIG. 4, along with the discussion of the same, should be understood as being illustrative only, and should not be treated as limiting.

Continuing with the discussion of how a process such as shown in FIG. 2 could be applied to payment card transaction routing, after the path selection criteria values had been calculated 204 (e.g., using a process such as shown in FIG. 4) a check could be made of if the total fees for any of the potential alternative networks (e.g., debit networks that support PINless processing) were less than the total fees for the default network (i.e., the "bugged" network). In the event that none of the alternative networks had lower fees than the default network, the default network could be treated 203 as optimal—e.g., by sending a message (e.g., a JSON message) back to the system that originally submitted the transaction indicating that the transaction was routable but that routing it through an alternative network would not be optimal.

Alternatively, if at least one of the alternative networks had costs lower than the default network, then a further database lookup could be performed to determine if there were any contextual considerations that should be applied to this routing determination. For example, a query could be made using the merchant ID initially passed through the API to determine if any rules had been defined by or for that merchant that should be applied to determine the appropriate routing for that merchant's transactions. This could be used to support situations such as where a transaction is submitted to a routing system 104 by an entity that had a contractual relationship with a payment processor requiring that entity to submit a certain volume of transactions to that processor on a monthly basis. To accommodate this, some embodiments may provide rules that would be invoked for that entity's transaction saying, for example, that the transaction should be routed to network X if it has lower fees than the default network, even if there are other alternative networks that may have fees lower than network X. As another example, in some embodiments rules that may be selectively applied to transactions based on their context (e.g., the entity that submitted them) may include a rule that a transaction should only be routed to an alternative network if the difference between fees for that network and fees for the default network met some threshold (e.g., at least 5% cheaper, or savings of at least Y specific dollar amount). As another example, in some embodiments rule that may be selectively applied to transactions based on their context may include a rule that a particular network should be chosen unless there was a different alternative network whose cost was lower than that of the specified network by some threshold. Other types of rules may also be supported in some embodiments, depending on the context in which they are deployed, and so the examples of different types of context specific rules that could be applied should be understood as being illustrative only, and should not be treated as limiting.

Once any context specific rules had been identified, if there were no such rules (e.g., because the transaction was submitted by an entity that wanted its transactions to simply be routed to the lowest cost network), then the routing network with the best previously identified path selection criteria values could be treated 205 as optimal. Otherwise, the context specific rules could be applied to determine 206 the optimal routing network giving the context of the transaction. In either case, once the optimal network has been identified, that identification may be used for routing the transaction. In some embodiments this could be done, for example, by the routing system 104 simply routing the transaction using the network identified as optimal (e.g., by encoding the transaction in a form usable by the relevant network, such as the network's implementation of the ISO 8583 messaging specification, and sending that transaction to the network via the network gateway 106). However, other approaches are also possible. For example, in some cases, a routing system 104 may send a message back to the original submitter of the transaction stating that there was no alternative network with a lower price than the default network, that there was no alternative network that satisfied the rules set for shifting the transaction away from the default network, or that there was an alternative network through which the transaction could be routed consistent with the rules (potentially with data indicating the savings that would be realized by using the alternative network). These types of alternatives may be used, for example, in cases where the entity that submits a transaction may want to subject it to some further analysis (e.g., using its own internal rules engine and internally maintained rules) after the initial analysis by the routing system 104.

Further alternatives are also possible. For instance, in some embodiments where the disclosed technology is used for routing payment card transactions, an API used to submit those transactions to a routing system 104 may not require submission of an amount for a transaction to be routed. This may be done, for example, to support a scenario in which an entity submitting the transaction would want to know if it could be routed to an alternative network (e.g., a debit network versus a default credit network), then perform some internal processing to determine if it would want to route the transaction itself (e.g., based on its own internal rules, such as those it may implement to ensure that a particular volume of transactions was sent to a particular provider), and only later route the transaction using the routing system 104 based on the results of its internal processing. In such a case, the routing system 104 may offer an API which could allow the entity submitting a transaction to optionally indicate (e.g., by using a different API endpoint) that it wanted only to know if a transaction could be routed, in which case it might be able to omit information from the API request that would not be necessary for making that initial determination (e.g., omitting the transaction amount, omitting the channel through which the transaction takes place).

Figure 5:
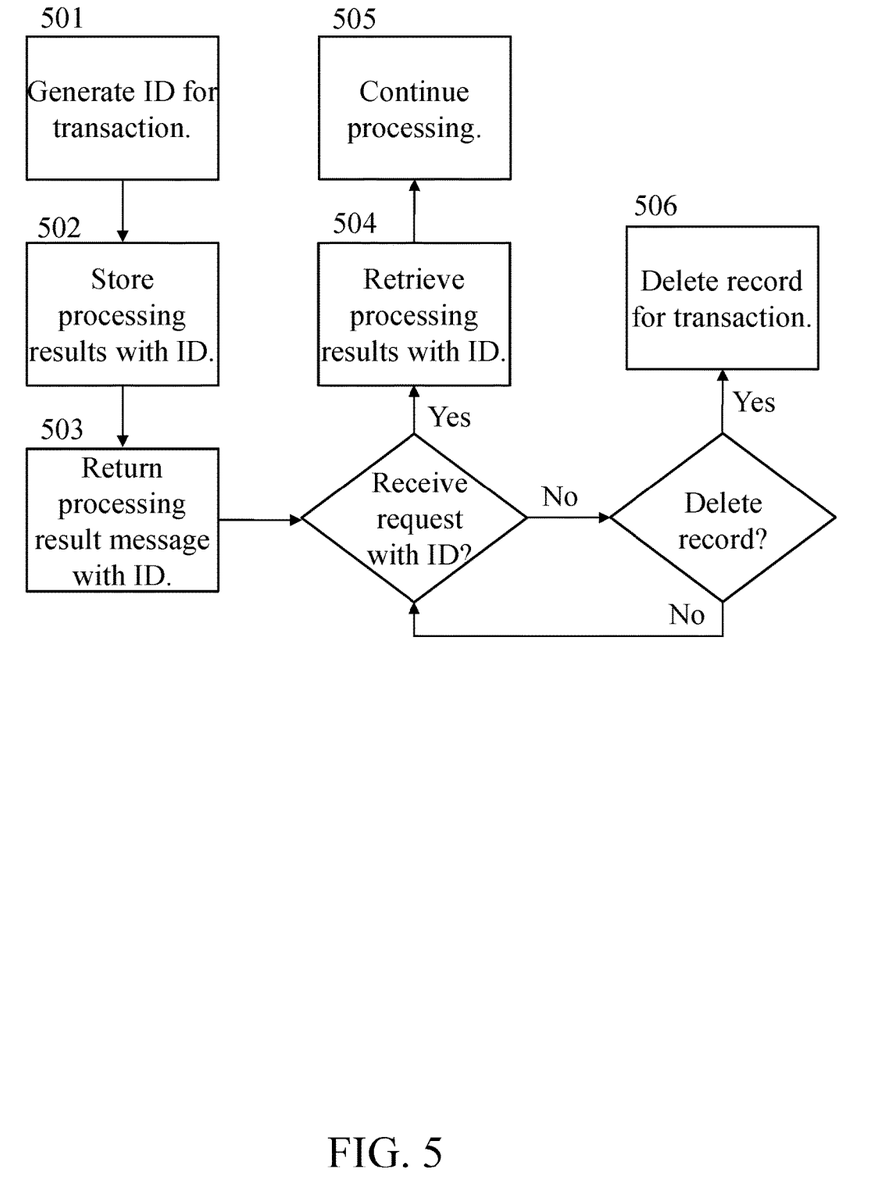
FIG. 5 depicts an exemplary intermediate processing preservation routine.

In embodiments where the type of alternative submission described above is supported, the entity maintaining the routing system 104 could process a transaction submitted for other than full routing in a manner similar to that described previously with respect to FIGS. 2-4. However, in this type of scenario, after the determination of alternative routing networks 202 rather than proceeding with the calculation of path selection criteria values 204, an intermediate processing preservation routine such as shown in FIG. 5 could be initiated. In the routine of FIG. 5, after the processing for the API request is completed (e.g., if the API request only indicated that the requestor wanted to know if the transaction could be routed to an alternative network, then after the alternative routing networks had been identified or after it had been determined that no such alternative networks were available) an ID could be generated 501 for the transaction associated with the API request. This could be done, for example, by submitting information for the transaction (e.g., the information submitted with the API request, combined with a time of submission) to a hash function to obtain a unique hash value that would function as the ID for the transaction.

After the ID for the transaction had been generated 501, a routine as shown in FIG. 5 would continue with storing 502 the results of the processing to that point along with the ID. This could be done, for example, by storing the information that had been generated to that point for the transaction (e.g., the potential networks, if the routine of FIG. 5 was started after the identification 304 of alternatives in a process such as shown in FIG. 3) in a table with the previously generated ID as a key. The ID and a result message could then be returned 503 as a response to the initial API request. In some embodiments this could be done by sending back a response that included the same information stored 502 by the routing system 104 in the preceding step. However, other approaches are also possible. For example, in some cases a result message could be sent that would reflect the processing that had been completed, but wouldn't include all of its outputs—e.g., a response stating that a transaction could be routed to an alternative network, but omitting what that alternative network is and/or how many alternatives existed.

After the processing result had been returned 503, a routing system 104 implementing an intermediate processing preservation routine such as shown in FIG. 5 could wait until a new request was submitted through the API that included the ID generated 501 previously. When such a request is received, the ID could be used (potentially after appropriate input validation checks had been performed on it, such as whether the ID was well formed, and whether the ID corresponded to a transaction whose processing the routing system 104 could potentially complete) to retrieve 504 the previously stored 502 information and continue 505 processing of the transaction (e.g., continue with a process such as shown in FIG. 2) without having to redo the work that had been done in response to the initial request. Alternatively, if no new API request including the previously generated 501 ID was received, the entity maintaining the routing system 104 could determine whether to delete the record of the transaction (e.g., by applying a retention policy that would specify that records should be deleted on periodic basis, or that they should be deleted after they had reached a certain age) and then delete 506 the record of the transaction (or not) as appropriate.

Of course, just as variations are possible in processes following those depicted in FIGS. 2-4, variations are also possible on intermediate processing preservation routines such as shown in FIG. 5. For example, in some embodiments which support intermediate processing preservation rather than simply deleting 506 records for transactions that are not fully processed those records could be used for other purposes, such as analytics to compare transaction that had been routed with those that had not to identify areas where the entity that submitted the API requests may be able to reduce their costs by more fully utilizing the capabilities of the routing system 104. Similarly, in some cases, an entity that performs an intermediate processing routine such as shown in FIG. 5 may simply maintain all records of transactions that had not been fully processed, in which case the deletion 506 step shown in FIG. 5 (and the corresponding determination of whether to delete) may be treated as being omitted. As another example of a type of variation that may be supported in some embodiments, in some cases an intermediate processing preservation routine such as shown in FIG. 5 could be invoked at portions of a process such as shown in FIG. 2 other than the determination 202 of alternative routing networks. For instance, where the necessary information had been provided, in some cases an intermediate processing preservation routine could be invoked after network costs had been calculated 204, after a check of whether any context specific considerations applied to the transaction, or even after an optimal network had been determined 206 based on those considerations (where they were present). Accordingly, the discussion above of FIG. 5, like the preceding discussion of the processes of FIGS. 2-4 and the environment of FIG. 1, should be understood as being illustrative only, and should not be treated as limiting.

In light of the potential for variations and modifications to the material described explicitly herein, the disclosure of this document should not be treated as implying limits on the protection provided by this document or any related document. Instead, the protection provided by a document which claims the benefit of or is otherwise related to this document should be understood as being defined by its claims, when the terms in those claims which are explicitly defined under the "Explicit Definitions" heading are given their explicit definitions, and when all other terms are given their broadest reasonable interpretation as shown by a general purpose dictionary. To the extent that the interpretation which would be given to the claims based on the above disclosure is in any way narrower than the interpretation which would be given based on the explicit definitions under the "Explicit Definitions" heading and the broadest reasonable interpretation as provided by a general purpose dictionary, the interpretation provided by the explicit definitions under the "Explicit Definitions" heading and broadest reasonable interpretation as provided by a general purpose dictionary shall control, and the inconsistent usage of terms in the specification shall have no effect.

Explicit Definitions

When used in the claims, "based on" should be understood to mean that something is determined at least in part by the thing that it is indicated as being "based on." When a claim is written to require something to be completely determined by a thing, it will be described as being "based EXCLUSIVELY on" the thing.

When used in the claims, a "computer" should be understood to refer to a group of devices (e.g., a device comprising a processor and a memory) capable of storing and executing instructions for performing one or more logical and/or physical operations on data to produce a result. A "computer" may include, for example, a single-core or multi-core microcontroller or microcomputer, a desktop, laptop or tablet computer, a smartphone, a server, or groups of the foregoing devices (e.g., a cluster of servers which are used in combination to perform operations on data for purposes such as redundancy and availability). In the claims, the word "server" should be understood as being a synonym for "computer," and the use of different words should be understood as intended to improve the readability of the claims, and not to imply that a "sever" is not a computer. Similarly, the various adjectives preceding the words "server" and "computer" in the claims are intended to improve readability, and should not be treated as limitations.

When used in the claims, "computer readable medium" should be understood to refer to any object, substance, or combination of objects or substances, capable of storing data or instructions in a form in which they can be retrieved and/or processed by a device. A computer readable medium should not be limited to any particular type or organization, and should be understood to include distributed and decentralized systems however they are physically or logically disposed, as well as storage objects of systems which are located in a defined and/or circumscribed physical and/or logical space. Examples of computer readable mediums including the following, each of which is an example of a non-transitory computer readable medium: volatile memory within a computer (e.g., RAM), registers, non-volatile memory within a computer (e.g., a hard disk), distributable media (e.g., CD-ROMs, thumb drives), and distributed memory (e.g., RAID arrays).

When used in the claims, to "configure" a computer should be understood to refer to providing the computer with specific data (which may include instructions) and/or making physical changes in the computer (e.g., adding peripherals) which can be used in performing the specific acts the computer is being "configured" to do. For example, installing Microsoft WORD on a computer "configures" that computer to function as a word processor, which it does using the instructions for Microsoft WORD in combination with other inputs, such as an operating system, and various peripherals (e.g., a keyboard, monitor, etc. . . . ).

When used in the claims, "first," "second" and other modifiers which precede nouns or noun phrases should be understood as being labels which are intended to improve the readability of the claims, and should not be treated as limitations. For example, references to a "first communication server" and a "second communication server" should not be understood as requiring that one of the recited servers precedes the other in time, priority, network location, or any other manner.

When used in the claims, "means for computer data routing optimization" should be understood as a means+function limitation as provided for in 35 U.S.C. § 112(f), in which the function is "computer data routing optimization" and the corresponding structure is a computer configured to perform processes as illustrated in FIGS. 2-5 and described in paragraphs 25-41.

When used in the claims, a "set" should be understood to refer to a group of one or more things of similar nature, design or function. The words "superset" and "subset" should be understood as being synonyms of "set," and the use of different words should be understood as intended to improve the readability of the claims, and not imply differences in meaning.

When used in the claims, "surpass" should be understood as meaning to be better than (e.g., lower price, higher savings, lower latency, higher speed, etc.).

What is claimed is:

1. A method for computer data routing optimization, the method comprising a set of route optimization steps comprising:
   a) receiving a data package, wherein the data package identifies a default routing network;
   b) determining a set of potential routing networks, wherein the set of potential routing networks comprises:
      i) the default routing networks; and
      ii) one or more alternative routing networks usable as alternatives to the default routing network;
   c) determining a corresponding path selection criteria value for each network from the set of potential routing networks;
   d) determining whether the corresponding path selection criteria value for at least one alternative network from the set of potential routing networks surpasses the corresponding path selection criteria value for the default routing network; and
   e) based on determining that the corresponding path selection criteria value for at least one alternative network from the set of potential routing networks surpasses the corresponding path selection criteria value for the default routing network:
      i) determining whether context specific rules should be applied to the set of potential routing networks; and
      ii) based on a determination that context specific rules should be applied to the set of potential routing networks, determining an optimal routing network by applying a set of one or more context specific rules to the set of potential routing networks.

2. The method of claim 1, wherein:
   a) determining whether context specific rules should be applied to the set of potential routing networks comprises determining whether context specific rules associated with a source of the data package had previously been stored in a database; and
   b) the database has stored therein a plurality of sets of context specific rules, each of which corresponds to a different data package source.

3. The method of claim 1, wherein the corresponding path selection criteria value for at least one network from the set of potential networks surpasses the corresponding path selection criteria value for the optimal routing network.

4. The method of claim 1, wherein, for each potential routing network, determining the corresponding path selection criteria value for that potential routing network comprises:
   a) determining two or more subcriteria values for that potential routing network; and
   b) combining each of the two or more subcriteria values for that potential routing network into the corresponding path selection criteria value for that potential routing network.

5. The method of claim 1, wherein:
   a) receiving the data package comprises receiving an indication that the data package should be only partially processed;
   b) the method comprises, after determining the set of potential routing networks:
      i) generating an ID for the set of potential routing networks;
      ii) storing intermediate processing data comprising the set of potential routing networks with the ID; and
      iii) sending an intermediate processing result message to a source of the data package, wherein the intermediate processing result message comprises the ID; and
      iv) ceasing performance of the set of route optimization steps;
   c) the method comprises, after sending the intermediate processing result message and ceasing performance of the set of route optimization steps:
      i) receiving a routing request comprising the ID; and
      ii) based on receiving the routing request comprising the ID:
         A) retrieving the intermediate processing data; and
         B) resuming the set of route optimization steps using the intermediate processing data.

6. The method of claim 5, wherein:
   a) the set of route optimization steps is performed using a route optimization server; and
   b) the method comprises:
      i) for each of a plurality of different data packages, performing one or more steps from the set of route optimization steps with that data package;
      ii) performing a comparison of one or more data packages that were routed by the route optimization server and one or more data packages that were not routed by the route optimization server during a preceding time period; and
      iii) based on the comparison, identifying one or more potential optimizations that could be made by one or more submitters of data packages during a subsequent time period.

7. A system for computer data routing optimization, the system comprising a computer adapted to perform a set of route optimization steps comprising
   a) receiving a data package, wherein the data package identifies a default routing network;
   b) determining a set of potential routing networks, wherein the set of potential routing networks comprises:
      i) the default routing networks; and
      ii) one or more alternative routing networks usable as alternatives to the default routing network;
   c) determining a corresponding path selection criteria value for each network from the set of potential routing networks;
   d) determining whether the corresponding path selection criteria value for at least one alternative network from the set of potential routing networks surpasses the corresponding path selection criteria value for the default routing network; and
   e) based on determining that the corresponding path selection criteria value for at least one alternative network from the set of potential routing networks surpasses the corresponding path selection criteria value for the default routing network:
      i) determining whether context specific rules should be applied to the set of potential routing networks; and
      ii) based on a determination that context specific rules should be applied to the set of potential routing networks, determining an optimal routing network by applying a set of one or more context specific rules to the set of potential routing networks.

8. The system of claim 7, wherein:
a) determining whether context specific rules should be applied to the set of potential routing networks comprises determining whether context specific rules associated with a source of the data package had previously been stored in a database; and
b) the database has stored therein a plurality of sets of context specific rules, each of which corresponds to a different data package source.

9. The system of claim 7, wherein the corresponding path selection criteria value for at least one network from the set of potential networks surpasses the corresponding path selection criteria value for the optimal routing network.

10. The system of claim 7, wherein, for each potential routing network, determining the corresponding path selection criteria value for that potential routing network comprises:
a) determining two or more subcriteria values for that potential routing network; and
b) combining each of the two or more subcriteria values for that potential routing network into the corresponding path selection criteria value for that potential routing network.

11. The system of claim 7, wherein:
a) receiving the data package comprises receiving an indication that the data package should be only partially processed;
b) the computer is adapted to, after determining the set of potential routing networks:
  i) generate an ID for the set of potential routing networks;
  ii) store intermediate processing data comprising the set of potential routing networks with the ID; and
  iii) send an intermediate processing result message to a source of the data package, wherein the intermediate processing result message comprises the ID; and
  iv) cease performance of the set of route optimization steps;
c) the computer is adapted to, after sending the intermediate processing result message and ceasing performance of the set of route optimization steps:
  i) receive a routing request comprising the ID; and
  ii) based on receiving the routing request comprising the ID:
    A) retrieve the intermediate processing data; and
    B) resume the set of route optimization steps using the intermediate processing data.

12. The system of claim 11, wherein the system is adapted to:
a) for each of a plurality of different data packages, performing one or more steps from the set of route optimization steps with that data package;
b) performing a comparison of one or more data packages that were routed by the computer and one or more data packages that were not routed by the computer during a preceding time period; and
c) based on the comparison, identifying one or more potential optimizations that could be made by one or more submitters of data packages during a subsequent time period.

* * * * *